July 13, 1954   R. W. GALLUP ET AL   2,683,373
GRAIN SAMPLER
Filed Aug. 13, 1952
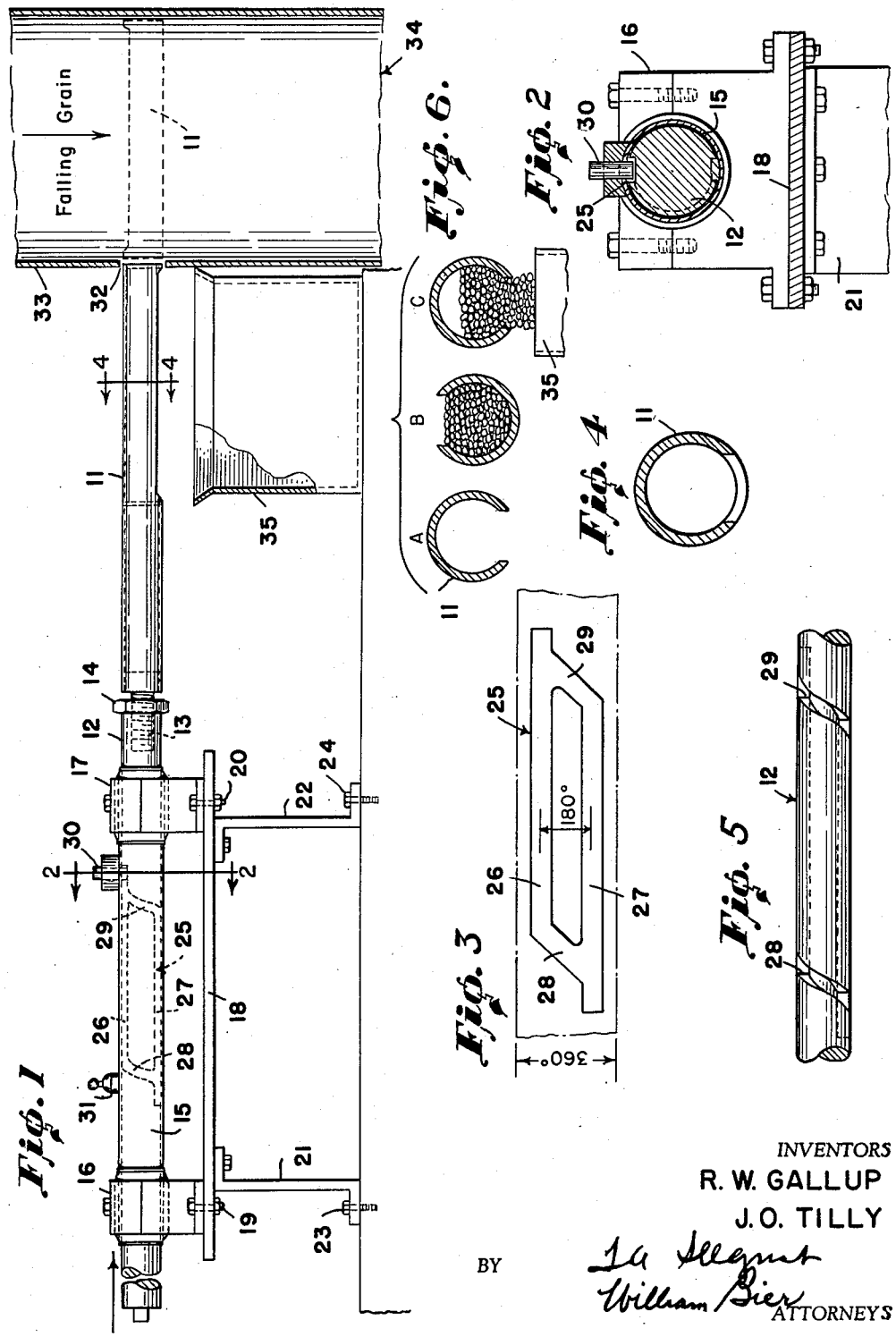
INVENTORS
R. W. GALLUP
J. O. TILLY
BY
ATTORNEYS

Patented July 13, 1954

2,683,373

UNITED STATES PATENT OFFICE 2,683,373

GRAIN SAMPLER

Richard W. Gallup and James O. Tilly, Downers Grove, Ill., assignors to the United States of America as represented by the Secretary of Agriculture Application August 13, 1952, Serial No. 304,233

3 Claims. (Cl. 73—422)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to a device for sampling grain.

In general, the invention provides a grain sampling device for use in combination with a vertical pipe for conveying grain, such as cereal grain, by dropping the grain therethrough. The sampling device is mounted adjacent to the pipe and has a sample capturing cup which is movable into and out of the pipe through an aperture in the wall of the pipe.

The sampling device provides a rod member having a sample capturing cup at one end thereof, means for reciprocating this rod member along its longitudinal axis, and means for rotating this rod member and cup about its longitudinal axis substantially 180 degrees at the end of each stroke thereof whereby the disposition of the cup is reversed at the end of each stroke of the rod member to provide for the cup's reception and discharge of samples. As a result of this action, a good representative sample of grain is obtained.

In the accompanying drawing

Figure 1 is a side elevation of a grain sampling device mounted adjacent to a vertical pipe, shown in section, through which grain is falling;

Figure 2 is a section along line 2—2 of Figure 1;

Figure 3 is an plane envelope of a detail;

Figure 4 is a section along line 4—4 of Figure 1;

Figure 5 is a detail view; and

Figure 6 consists of views showing the sample capturing cup in empty condition (A), filled with grain (B), and emptying the grain (C).

Referring to the drawing, the grain sampling device provides a sample capturing cup 11 coupled to a rod member 12 by means of threaded plug 13 and locknut 14. This rod member is mounted for reciprocatory movement along and rotational movement about its longitudinal axis as will be apparent from the description hereafter.

The rod member is positioned in stationary bearing sleeve 15 supported in housings 16 and 17 and is horizontally and rotably movable in the sleeve, the housings, in turn, being fixed to a base 18 by means of bolts 19 and 20. The base itself is also held in immovable position by means of brackets 21 and 22 and bolts 23 and 24.

Means for reciprocating and rotating the rod member are also provided, as for example, cam means. In the preferred means, the rod member 12 carries on its surface a continuous keyway 25 in form of two parallel horizontal grooved portions 26 and 27 interconnected at their ends with slanting grooved portions 28 and 29 respectively. A fixed pin 30, carried by sleeve 15, extends into the keyway and functions to operate therein as will be explained hereinafter. A grease fitting 31 is also provided for keeping the mechanism in lubricated condition.

In operating the grain sampling device, the rod member 12, which may be either power or manually driven, as for example by means of a handle connected to the shaft 12 at its free end with a swivel coupling (not shown), is reciprocated in sleeve 15. As the rod member moves forward, pin 30 rides in horizontal portion 26 of keyway 25 while cup 11, with openside down, passes through aperture 32 in wall 33 of pipe 34 down which grain is falling. As the pin reaches the end of the horizontal portion 26, it then rides into slanting portion 28 of the keyway causing the rod member 12 to rotate as a result of which the cup 11 makes a 180° turn so that the openside of the cup faces upward (as shown in dotted line in Figure 1) and fills with the falling grain. As the rod member moves backward, the pin rides in the backward-moving horizontal portion 27 causing cup 11 containing the grain to move openside up out of the pipe 34. When the pin reaches slanting portion 29 it rides therein causing the rod member 12 to rotate whereupon the cup is turned with its openside down causing the grain to fall into a container 35 provided for that purpose. The sampling device, at this stage, is in position to start the entire sampling process again.

We claim:

1. In a sampling device of the class described, a rod member mounted for rotational movement about and reciprocatory movement along its longitudinal axis, a sample capturing cup mounted at one end of said rod, means having connection with the other end of said rod for imparting reciprocating motion thereto, and cam means operatively connected to said rod to rotate said rod and cup substantially 180 degrees at the end of each stroke thereof whereby the disposition of said cup is reversed at the end of each stroke of said rod to provide for the cup's reception and discharge of samples.

2. In a sampling device of the class described, a rod member having a sample capturing cup at one end thereof, said rod member being mounted for rotation about and reciprocation along its longitudinal axis, means for reciprocating said rod member and for rotating it substantially 180 degrees at the end of each stroke thereof, said reciprocating and rotating means comprising a stationary bearing sleeve in which the said rod member is reciprocated and rotated, said rod member having a continuous keyway located in the surface thereof, and a pin carried by the said sleeve and operating in the keyway, said keyway having two parallel horizontal grooved portions interconnected at their ends with slanting grooved portions such that as the rod member is reciprocated in the said sleeve the pin rides in the keyway causing the rod member to rotate substantially 180 degrees at the end of each stroke thereof whereby the disposition of the said cup is reversed at the end of each stroke of the said rod to provide for the cup's reception and discharge of samples.

3. In a sampling device of the class described, a rod member having a sample capturing cup at one end thereof, means for reciprocating said rod member along its longitudinal axis, and means for rotating said rod member about its longitudinal axis substantially 180 degrees at the end of each stroke thereof whereby the disposition of said cup is reversed at the end of each stroke of said rod to provide for the cup's reception and discharge of samples.

References Cited in the file of this patent

UNITED STATES PATENTS

| Number | Name | Date |
| --- | --- | --- |
| 1,155,670 | McGregor | Oct. 5, 1915 |
| 1,966,712 | Fisher | July 17, 1934 |
| 2,495,944 | Pletta et al. | Jan. 31, 1950 |
| 2,615,339 | Holgerson | Oct. 28, 1952 |